United States Patent

Depatie et al.

Patent Number: 5,917,303
Date of Patent: Jun. 29, 1999

[54] DEVICE FOR CONTROLLING A STEPPER MOTOR THAT DRIVES ONE OR MORE CAMERA ELEMENTS

[75] Inventors: Jean Francois Depatie, Albion; J. Kelly Lee; Allan MacGregor Waugh, both of Rochester; James Joseph Parker, Jr., Hamlin, all of N.Y.

[73] Assignee: Eastman Kodak Company, Rochester, N.Y.

[21] Appl. No.: 08/133,492

[22] Filed: Oct. 7, 1993

[51] Int. Cl.$^6$ ..................................................... G05B 17/40
[52] U.S. Cl. ............................................................. 318/685
[58] Field of Search ...................................... 318/685, 696, 318/254, 439, 638, 640; 354/422, 435, 439, 452, 149.1, 234.1

[56] References Cited

U.S. PATENT DOCUMENTS

| | | |
|---|---|---|
| 3,189,890 | 6/1965 | Gilbert et al. . |
| 3,239,817 | 3/1966 | Spetz . |
| 3,882,522 | 5/1975 | Erlichman ................................. 354/30 |
| 3,961,232 | 6/1976 | Newell . |
| 4,158,800 | 6/1979 | Jahelka et al. . |
| 4,557,573 | 12/1985 | Johnson et al. . |
| 4,572,645 | 2/1986 | Yoshida et al. . |
| 4,630,033 | 12/1986 | Baker . |
| 4,696,560 | 9/1987 | Ogihara et al. . |
| 4,812,727 | 3/1989 | Sakai et al. ............................. 318/696 |
| 4,835,558 | 5/1989 | Araki et al. . |
| 4,878,077 | 10/1989 | Maeno et al. ....................... 318/685 X |
| 4,893,142 | 1/1990 | Ishida et al. . |
| 4,907,027 | 3/1990 | Kobe et al. . |
| 4,942,415 | 7/1990 | Felle et al. . |
| 4,982,218 | 1/1991 | Tsuboi et al. . |
| 4,989,030 | 1/1991 | Naka et al. . |
| 5,014,082 | 5/1991 | Farrington . |
| 5,057,859 | 10/1991 | Ishimaru ............................. 318/685 X |
| 5,087,812 | 2/1992 | Tsukada . |
| 5,134,435 | 7/1992 | Tsuboi et al. . |
| 5,144,352 | 9/1992 | Shono . |
| 5,168,295 | 12/1992 | Yoshihara et al. . |
| 5,210,562 | 5/1993 | Miyazawa et al. .................. 318/685 X |

*Primary Examiner*—Jonathan Wysocki
*Attorney, Agent, or Firm*—Gordon M. Stewart

[57] ABSTRACT

A device for controlling a stepper motor that drives a plurality of shutter blades. The movement and position of the movement of the rotor of the stepper motor is monitored to determine when the next step of the stepper motor should be stepped so that the rotation of the rotor will be known to cause the shutter blades to form the correct aperture size. The device may also be used to drive an automatic focusing mechanism and/or zoom.

17 Claims, 14 Drawing Sheets

WAVEFORMS FROM ENCODER AND DRIVE VOLTAGES TO MOTOR

DEVICE FOR CONTROLLING A STEPPER MOTOR THAT DRIVES ONE OR MORE CAMERA ELEMENTS

FIELD OF THE INVENTION

The invention relates generally to the field of stepper motors, and particularly to stepper motor control of electronically driven camera elements.

BACKGROUND OF THE INVENTION

A stepper motor is an electromechanical device which rotates a discrete step angle when energized electrically. Stepper motors contain a rotor that has a permanent cylindrical magnet with many poles around its circumference. The rotor rotates inside two sets of stator coils, each of which has a row of metal teeth. When an electric current is transmitted to a stator, each north pole on the rotor lines up with an overlapping pair of south poles on the stator teeth, while each south pole on the rotor lines up with a pair of north poles on the stator teeth. When the current transmitted to the stator is reversed, each pole on the rotor shifts by one stator tooth.

The step angle is fixed for a particular motor and thus, provides a means for accurately positioning in a repeatable uniform manner. Typical step angles vary from as small as 0.72 degrees to as large as 90 degrees. The stepper motor starts and stops in discrete angular excursions of uniform moves so that the output steps are always equal to the number of input pulses.

Small stepper motors have been utilized to drive a set of camera shutter blades. The number of pulses transmitted to the stepper motor determines the aperture achieved by the shutter blades. Such shutter blades are reasonably fast and simple to drive electronically. The prior art utilized carefully tailored pulses to generate controlled wave forms. The carefully tailored pulses help to assure that the shutter blades achieve its aperture position as quickly as possible. Stepper motors, however, are notorious for erratic performance due to inertia effects, temperature friction, and a host of other subtle phenomena.

The prior art attempted to solve the temperature problem by trying to drive constant current into the stator coils over the desired temperature range. In some cases the above is useful in reducing the variations in the torque of the stepper motor due to temperature variation. However, the above does not eliminate the effect friction has on the performance of the stepper motor. Usually the only thing that can be done about the variation of friction with temperature is to try to eliminate the friction from the system by using low friction materials wherever components rub.

Problems To Be Solved By The Invention

One of the disadvantages of prior art shutter blades were that the shutter blades were sensitive to environmental effects, i.e., temperature. Cameras are expected to operate reliably over a temperature range of 0 degrees F. to 120 degrees F. Temperature variations cause many problems with stepper motors that control shutter blades. When the temperature drops the conductivity of copper in the stator coil goes up and the magnetization of the rotors magnets goes up. Thus, the above phenomena will effect the aperture achieved by the shutter blades.

Another problem of the prior art was that the proper operation of the existing stepper motor driven shutters are dependent on a finite amount of friction in the system. In other words the shutters work well at room temperature but not over a broad temperature range. The primary contributor to the above problem is the change of friction with temperature.

Another problem of the prior art was that some stepper motor control systems were large and complex and required accurate positional information about the stepper motors rotor to control the stepper motor.

An additional problem of the prior art is that existing methods of controlling stepper motors are large and complex and not readily usable to control the shutter blades of a camera.

SUMMARY OF THE INVENTION

The present invention overcomes the disadvantages of the prior art by providing a simple inexpensive feedback mechanism for a stepper motor that drives a plurality of shutter blades. The above feedback mechanism permits the shutter blades that are driven by a stepper motor to perform better over a wide temperature range. The invention also compensates for frictional variations due to manufacturing.

The present invention also provides an inexpensive feedback mechanism for a stepper motor that drives various camera elements, i.e. focusing mechanism, zoom, etc.

Advantageous Effects Of The Invention

The effects of temperature and friction on the shutter blades driven by the stepper motor is compensated by the use of the simple inexpensive feedback mechanism of this invention. This will insure that shutter blades move to the correct aperture opening as soon as possible.

Another advantage of this invention is that the feedback mechanism will insure synchronization between the rotor and the input pulses to the stator of the stepper motor. This provides accurate formation of aperture openings by the shutter blades.

Another advantage of this invention is that it is small and inexpensive.

An additional advantage of this invention is that the stepper motor feedback mechanism may accurately drive: automatic focusing mechanisms, zooms, etc.

The foregoing is accomplished by providing a device for controlling a stepper motor that drives one or more camera elements, in which the rotation and position of the rotor of the stepper motor is monitored to determine when the next step of the stepper motor should be stepped, the device characterized by: a rotor positional indicator having equally spaced first and second areas that equal the number of steps for one full revolution of the rotor of the stepper motor; means coupled to the indicator for detecting the transitions between the first and second areas; and means coupled to the detecting means for rotating the rotor of the stepper motor relative to the position of the rotor of the stepper motor so that the stepper motor has the proper number of steps to cause the camera element to move to the correct position.

DESCRIPTION OF THE PREFERRED EMBODIMENTS

Figure 1:
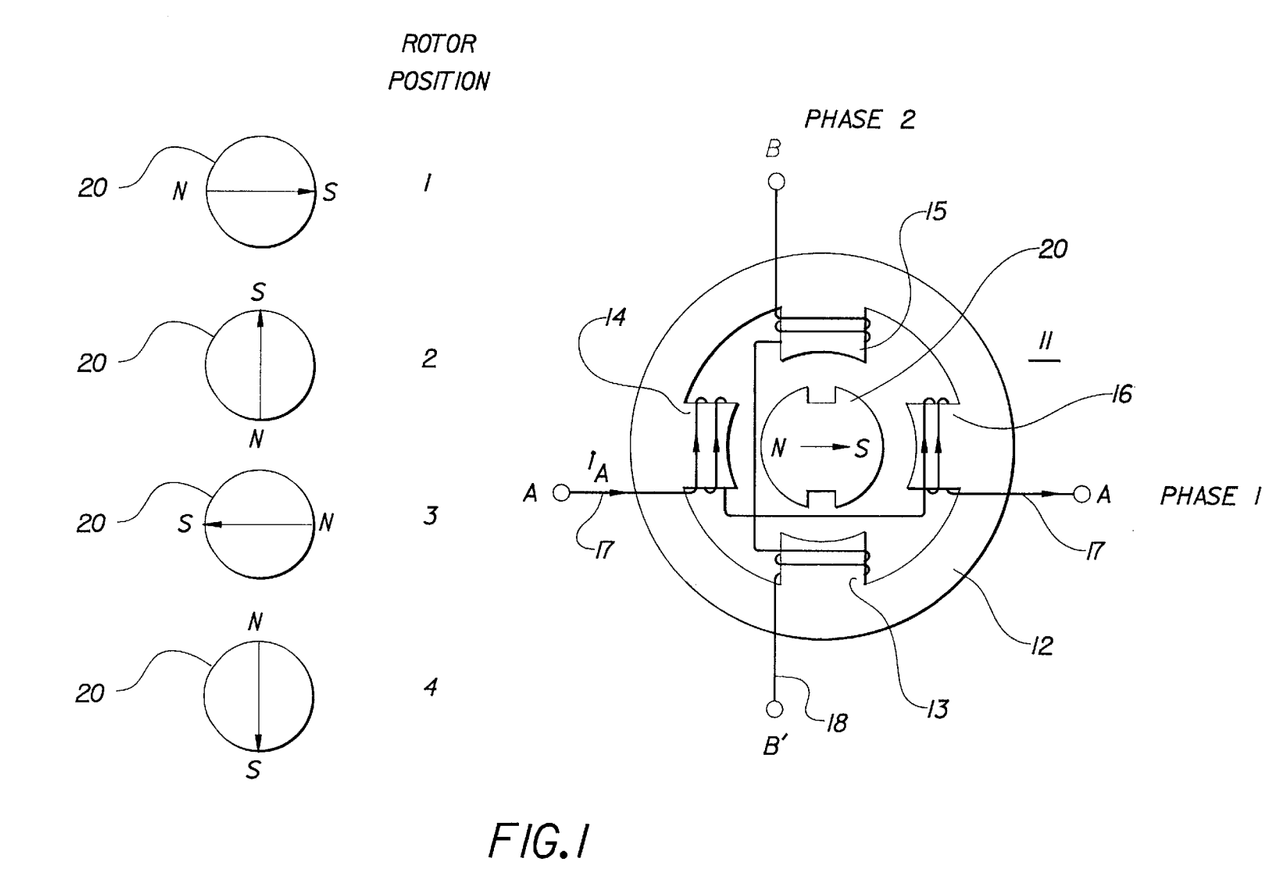
FIG. 1 is a schematic drawing of a simple 90 degree permanent magnet stepper motor and possible positions of rotor 20.

Referring now to the drawings in detail, and more particularly to FIG. 1, the reference character 11 represents a simple permanent magnet stepper motor, that is only being used for illustrative purposes. Motor 11 has a step size of 90 degrees. Motor 11 has a stator 12 and a rotor 20. Stator 12 has four teeth 13, 14, 15 and 16. Coil 17 is wound around teeth 14 and 16 and coil 18 is wound around teeth 13 and 15. Coil 17 has terminals A and A' and coil 18 has terminals B and B'. Rotor 20 has a north pole which is designated by the letter N and a south pole which is designated by the letter S.

In practice stepper motor 11 will have two coils, a rotor magnet with many poles and a stator with many teeth. The actual stepper motor utilized in this invention may have 10 or more poles on the magnet and a step size of 18 degree or less mechanical angle in order to form many different aperture openings.

When current is applied to coil 17 with the current entering terminal A (phase 1) rotor 20 rotates to position 1 and when current is applied to coil 18 with the current entering terminal B' rotor 20 rotates to position 2. When current is applied to coil 17 with the current entering terminal A' rotor 20 rotates to position 3 and when current is applied to coil 18 with the current entering terminal B rotor 20 rotates to position 4. The above sequence may be sequentially repeated to achieve a counter clockwise rotation of rotor 20 or the sequence may be reversed to achieve a clockwise rotation of rotor 20.

The major problem with stepper motor 11 is that it is generally operated as a open loop system, i.e. the current is applied alternately to coils 17 and 18 not knowing whether rotor 20 actually made it to the previous position. If the frequency of the stepping is too fast it can easily be appreciated that rotor 20 might lose synchronization or move in a random direction. Generally if the drag torque due to the load rises a little due to an increase in friction the signal to step to the next position may be applied before rotor 20 has reached the previous position. If this happens rotor 20 may stall and even reverse. The higher load inertia, of course, the more severe the problem is.

Figure 2:
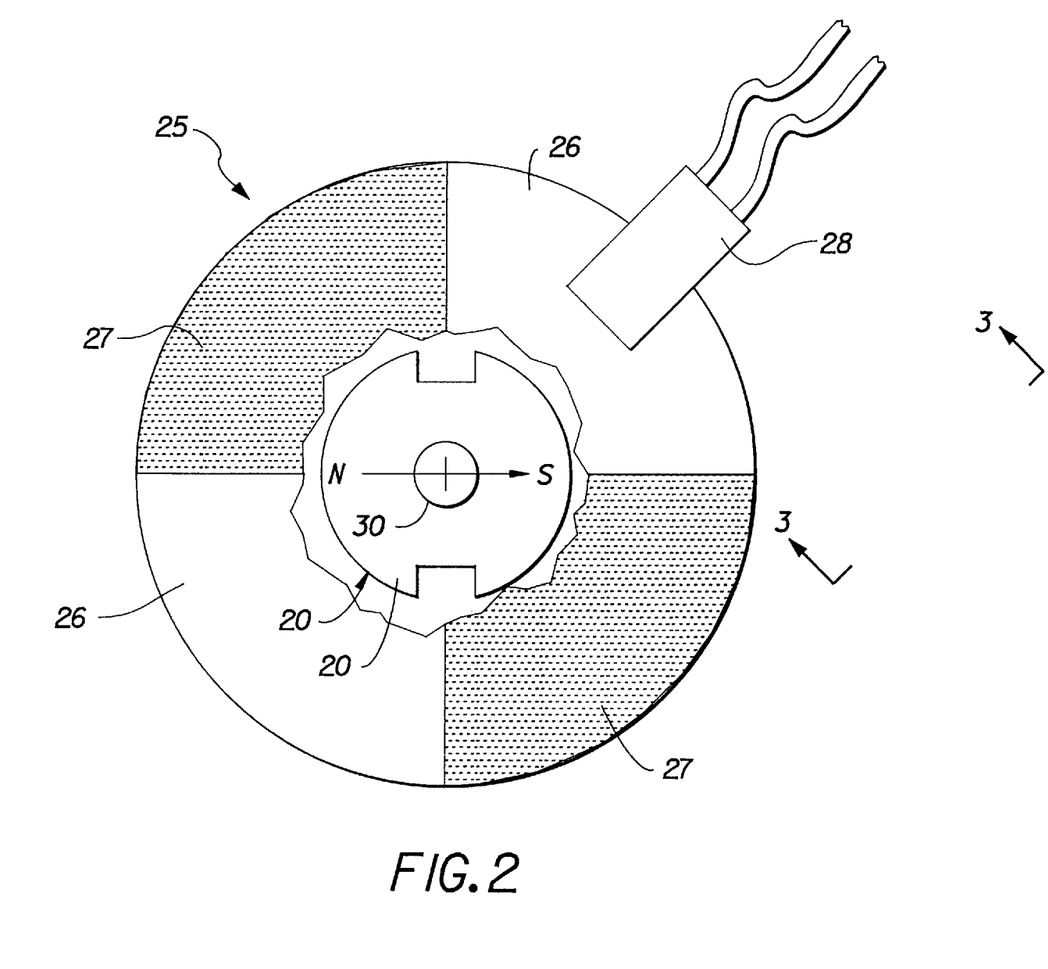
FIG. 2 is a drawing of an optical interrupter and disk used as a optical feedback mechanism for determining the position of rotor 20.

FIG. 2 is a drawing of a optical feedback mechanism that overcomes the problem mentioned in the description of FIG. 1. A disk 25, made of any light material, i.e. plastic is connected to shaft 30 of rotor 20 of stepper motor 11. Disk 25 contains alternate transparent areas 26 and opaque areas 27. Optical interrupter 28 is positioned in a manner that it will sense the rotational position between rotor 20 and stator 12. Interrupter 28 senses the transitions between light areas 26 and dark areas 27 on disk 25. Optical interrupter 28 senses the position of disk 25 containing alternate transparent areas 26 and opaque areas 27. Electronically the signal to cause rotor 20 to move to the next position is not given until disk 25 has moved to cause a transition from transparent area 26 to opaque area 27 or from opaque area 27 to transparent area 26. Thus, electronic signal used to move rotor 20 is applied for whatever length of time it takes to achieve the required movement to the next position.

Figure 3:
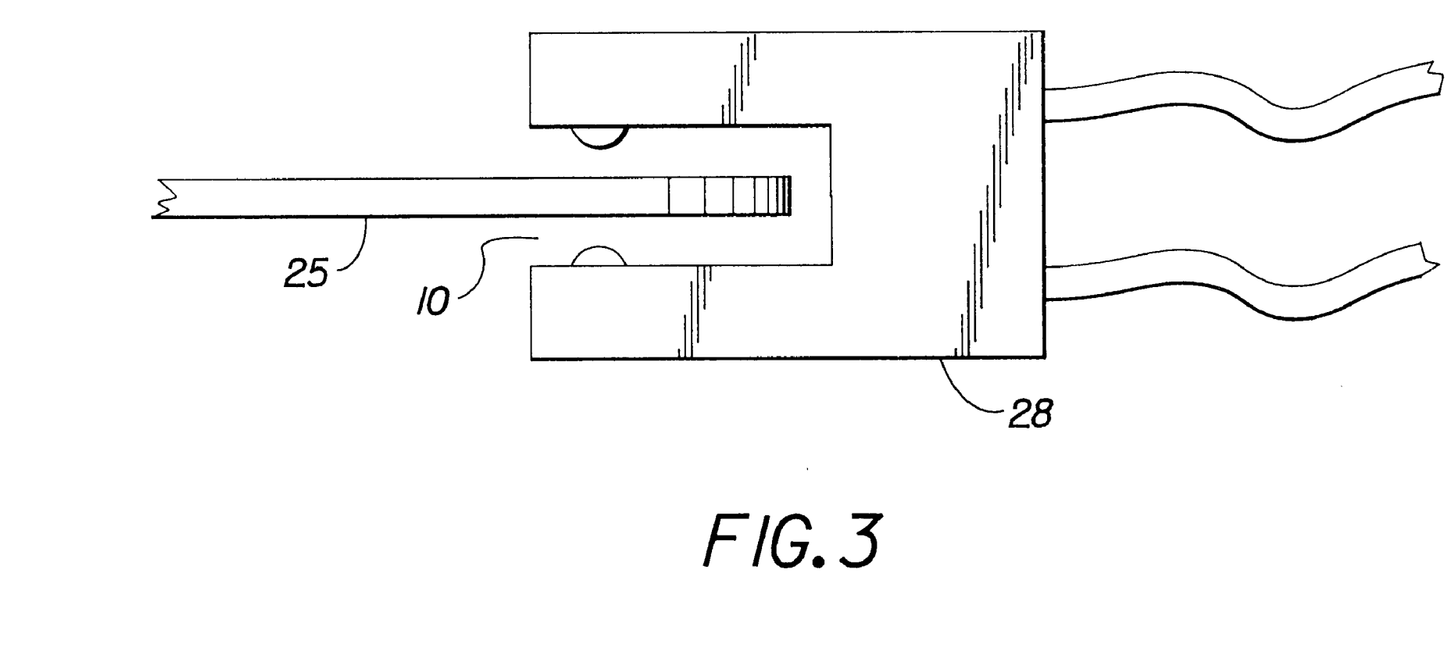
FIG. 3 is a side view of interrupter 28 and disk 25 of FIG. 2.

FIG. 3 is a side view of interrupter 28 and disk 25 of FIG. 2. Interrupter 28 has a slot 10. Disk 25 is positioned within slot 10 in such a manner that interrupter 28 will sense the transitions between transparent areas 26 and opaque areas 27, when disk 25 is rotated with shaft 30 and rotor 20.

Figure 4:
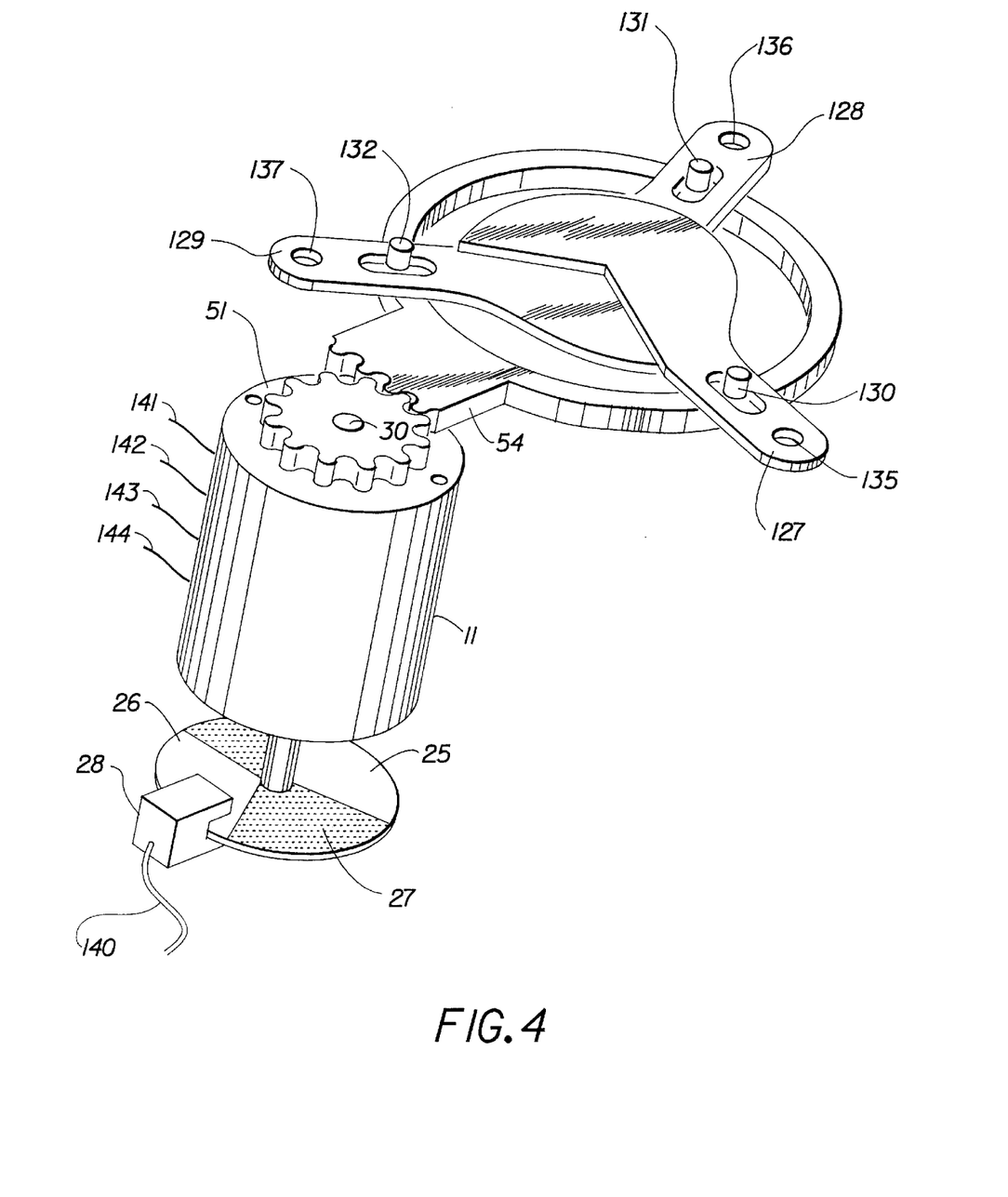
FIG. 4 is a diagram of a stepper motor that drives a plurality of shutter blades with rotor positional feedback.

FIG. 4 is a diagram of a stepper motor that drives a plurality of shutter blades with rotational feedback. Interrupter 28 has a slot 10. Disk 25 is positioned within slot 10 in such a manner that interrupter 28 will sense the transitions between transparent areas 26 and opaque areas 27, when disk 25 is rotated with shaft 30 and rotor 20 (shown in FIG. 3). Feedback signal wire 140 is connected to interrupter 28 and drive signal wires 141–144 are connected to stepper motor 11. Wires 140–144 will be more fully described in the description of FIG. 5.

When current is supplied to stepper motor 11 via drive signal wires 141–144, stepper motor 11 rotates in the manner described in FIG. 1 and disk 25 will move in between optical interrupter 28 in the manner described in FIG. 2.

Pinion 51 is connected to shaft 30 of stepper motor 11. Pinion 51 engages sector ring gear 54. Sector ring gear 54 is connected to shutter blades 127, 128 and 129. Sector ring gear 54 turns on bearings (not shown). Pin 130 connects shutter blade 127 to sector ring gear 54 and pin 131 connects shutter blade 128 to shutter ring gear 54. Shutter blade 129 is connected to shutter ring gear 54 by pin 132. Shutter blade 127 pivots about pin 135 and shutter blade 128 pivots about pin 136. Shutter blade 129 pivots about pin 137. It is realized that additional pins may be used to connect additional shutter blades to sector ring gear 54 to increase the roundness of aperture openings.

Figure 5A:
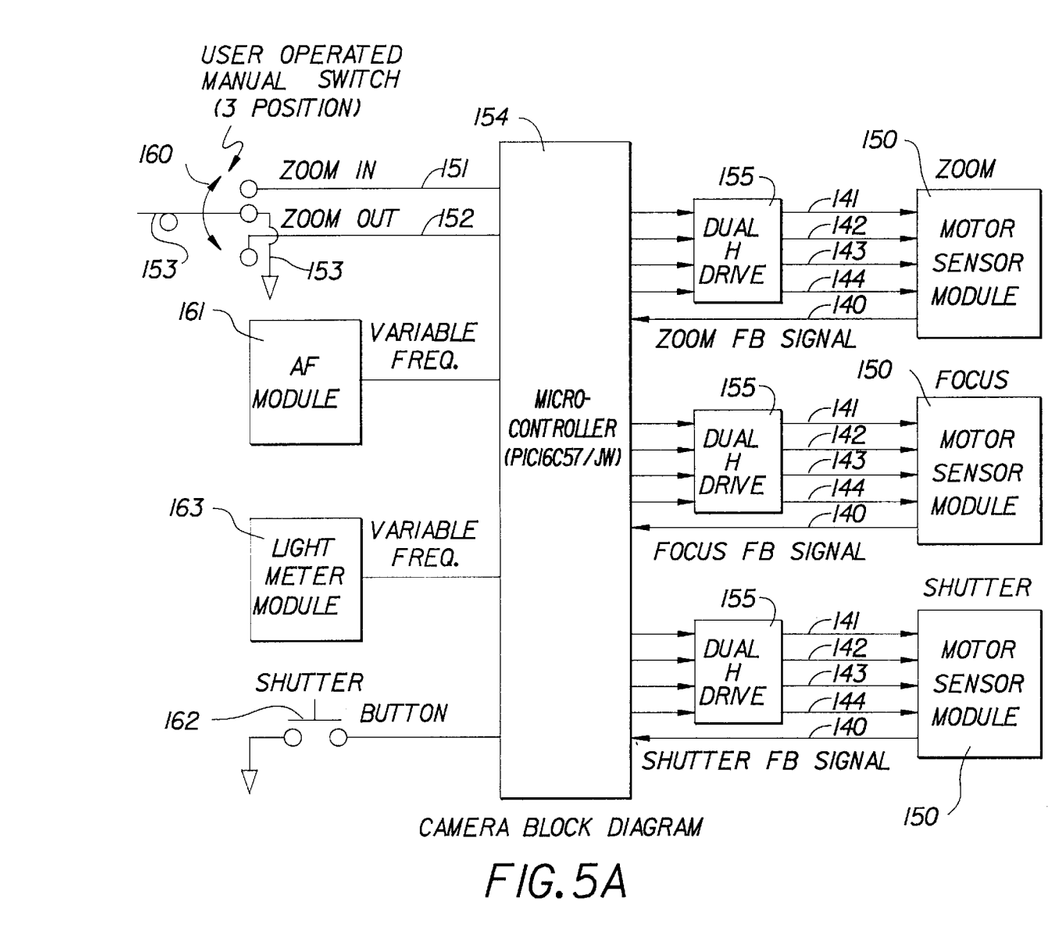
FIG. 5 is a diagram of control electronics for a stepper motor module that drives a zoom, automatic focusing mechanism and a shutter.
Figure 5B:
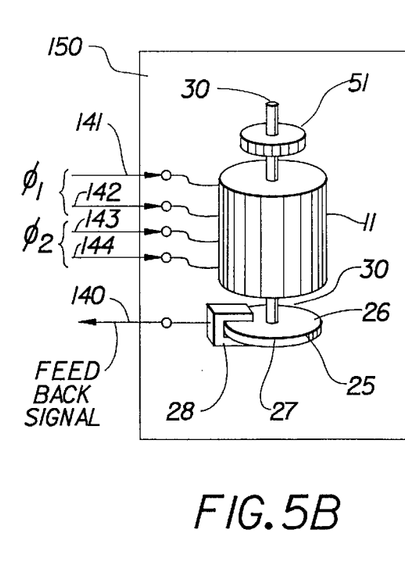

FIG. 5 is a diagram of control electronics for a stepper motor module 150 that drives a zoom, an automatic focusing mechanism or a plurality of shutter blades (not shown).

For the zoom function, three position manual switch 160 is connected to one end of wires 151, 152 and 153. The other end of wires 151 and 152 are connected to micro controller 154. The other end of wire 153 is connected to ground. When switch 160 is connected to wire 151 the zoom will move in and when switch 160 is connected to wire 152 the zoom will move out. When switch 160 is connected to wire 153 the zoom will halt and remain in the position that it is in.

Figure 7A:
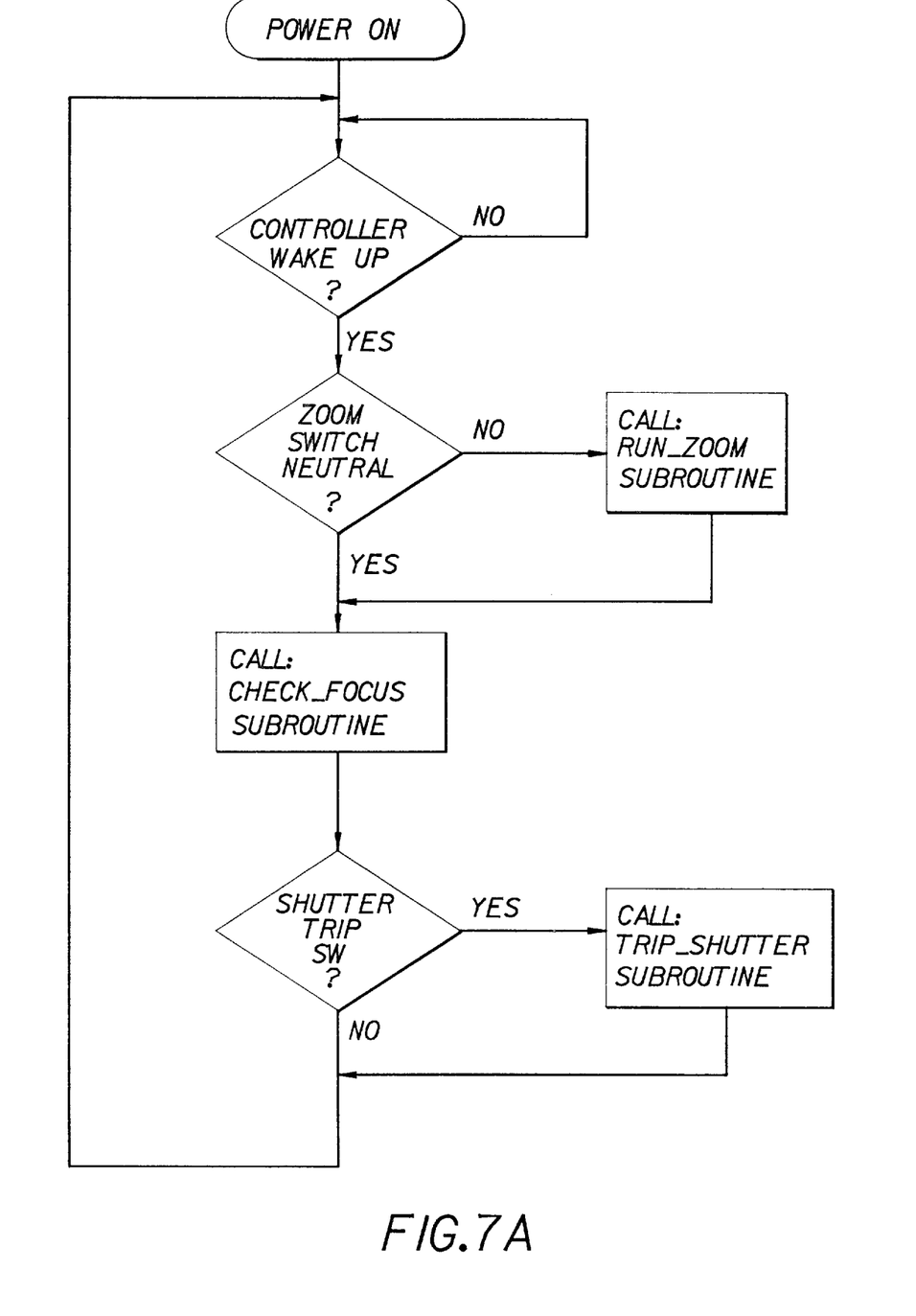
FIGS. 7A–7E is a flow chart of the program for micro controller 154 of FIG. 5.

Micro controller 154 is the PIC 16C57/JW micro controller manufactured by Microchip Technology, Inc. of 2355 West Chandler Blvd., Chandler Ariz. 85224-6199. The flow chart for the program that controls micro controller 154 will be described in the description of FIG. 7.

The output of micro controller 154 is transmitted to dual H bridge driver 155. Dual H bridge driver 155 is the dual H bridge driver LB1836 manufactured by Sanyo Electric Company Ltd. Semiconductor of Tokyo Building, 1-10, 1-C Home Veno, Taito-KU, Tokyo 10010 Japan. Wires 141–144 transmit the output of driver 155 to the input of stepper motor sensor module 150.

Motor sensor module 150 includes pinion 51; shaft 30; stepper motor 11; disk 25; interrupter 28 and wires 140–144. Pinion 51 is connected to shaft 30 of stepper motor 11. Shaft 30 is also connected to disk 25 which has transparent areas 26 an opaque areas 27. Disk 25 is positioned within slot 10 of interrupter 28 in such a manner, that interrupter 28 will sense the transitions between transparent areas 26 and opaque areas 27, when disk 25 is rotated within shaft 30 and rotor 20 (described in the description of FIG. 2).

Drive signal wires 141 and 142 are respectively connected to terminals A and A' of coil 17 (FIG. 1) of stepper motor 11 and drive signal wires 143 and 144 are connected to terminals B and B' of coil 18 (FIG. 1) of stepper motor 11.

When micro controller 154 transmits; a pulse sequence to dual H drive 155 requesting that the zoom, zooms in, wires 141 and 142 will transmit a signal to coil 17 of stepper motor 11. The above signal will cause rotor 20 (FIG. 1) to rotate shaft 30 and disk 25 in slot 10 of interrupter 28. Which will cause the zoom to zoom in. A feedback signal from interrupter 28 will be transmitted on wire 140 to one of the inputs of micro controller 154. The feedback signal will be described in the description of FIG. 8.

When micro controller 154 transmits a pulse sequence to dual H drive 155 requesting that the zoom, zooms out, wires 143 and 144 will transmit a signal to coil 18 of stepper motor 11. The above signal will cause rotor 20 (FIG. 1) to rotate shaft 30 and disk 25 in slot 10 of interrupter 28. Which will cause the zoom to zoom out. A feedback signal from interrupter 28 will be transmitted on wire 140 to one of the inputs of micro controller 154. The feedback signal will be described in the description of FIG. 8.

Stepper motor 11 comes in different sizes and different sizes of stepper motor 11 will be used for the zoom, automatic focus and shutter functions.

For the automatic focusing function, an auto-focusing module 161 is connected to micro controller 154. Automatic focusing module 161 transmits a variable frequency signal to the input of micro controller 154. The frequency of the aforementioned signal is dependent on the distance between the subject and module 161.

The output of micro controller 154 is transmitted to dual H bridge driver 155. Wires 141–144 transmit the output of driver 155 to the input of stepper motor sensor module 150.

When micro controller 154 transmits a pulse sequence to dual H drive 155 requesting that automatic focusing module 161, focuses in, wires 141 and 142 will transmit a signal to coil 17 of stepper motor 11. The above signal will cause rotor 20 (FIG. 1) to rotate shaft 30 and disk 25 in slot 10 of interrupter 28. Which will cause automatic focusing mechanism to focus in. A feedback signal from interrupter 28 will be transmitted on wire 140 to one of the inputs of micro controller 154. The feedback signal will be described in the description of FIG. 8.

When micro controller 154 transmits a pulse sequence to dual H drive 155 requesting that the automatic focusing mechanism, focus out, wires 143 and 144 will transmit a signal to coil 18 of stepper motor 11. The above signal will cause rotor 20 (FIG. 1) to rotate shaft 30 and disk 25 in slot 10 of interrupter 28. Which will cause the automatic focusing mechanism to focus out. A feedback signal from interrupter 28 will be transmitted on wire 140 to one of the inputs of micro controller 154. The feedback signal will be described in the description of FIG. 8.

For the shuttering function, shutter button 162 is connected to ground and to micro controller 154. Light meter module 163 is connected to micro controller 154. Light meter module 163 transmits a variable frequency signal to the input of micro controller 154. The frequency of the aforementioned signal is dependent upon the amount of light present. Micro controller 154 utilizes a look-up table to determine the correct aperture opening and shutter speed for a specified frequency signal.

The output of micro controller 154 is transmitted to dual H bridge driver 155. Wires 141–144 transmit the output of driver 155 to the input of stepper motor sensor module 150.

When micro controller 154 transmits a pulse sequence to dual H drive 155 requesting that the shutter blades form a specific aperture opening and have a specific shutter speed, a signal will be transmitted on wires 141–144. The above signal will cause stepper motor 11 to rotate in the manner described in FIG. 1 and disk 25 to rotate in the manner described in FIG. 2.

Figure 6:
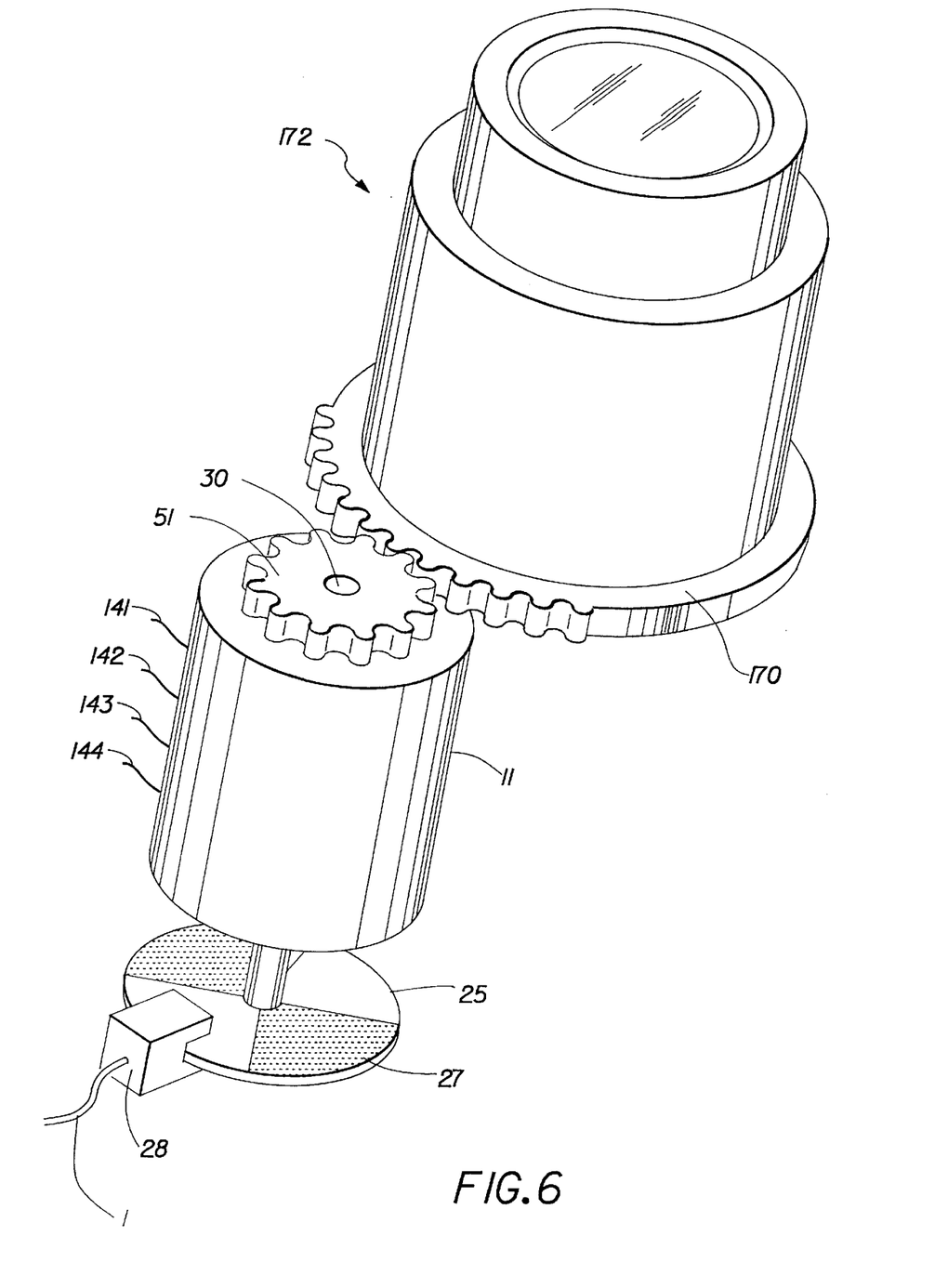
FIG. 6 is a diagram of a stepper motor that drives a zoom or automatic focusing mechanism.

FIG. 6 is a diagram of a stepper motor that drives a zoom or automatic focusing mechanism. Interrupter 28 has a slot 10. Disk 25 is positioned within slot 10 in such a manner that interrupter 28 will sense the transitions between transparent areas 26 and opaque areas 27, when disk 25 is rotated with shaft 30 and rotor 20 (shown in FIG. 3). Feedback signal wire 140 is connected to interrupter 28 and drive signal wires 141–144 are connected to stepper motor 11. Wires 140–144 will be more fully described in the description of FIG. 5. Pinion 51 is connected to shaft 30 of stepper motor 11. Pinion 51 engages gear 170. Gear 170 is connected to an automatic focusing mechanism or a zoom 172.

The programming of microprocessor 154 of FIGS. 4–6, will be apparent from the flow chart shown in FIGS. 7A–7E. FIG. 7A is a flow chart of the over all program shown in FIGS. 7B–7E. FIGS. 7B–7E are descriptions of the subroutines of the program described in FIG. 7A Returning to FIG. 7A, when the power of the camera is turned on, the "micro controller" wake up for micro controller 154 (FIG. 5) will wake up and begin monitoring three position zoom switch 160. If switch 160 is placed in a position other than neutral, then and in that event the call "run-zoom" subroutine will be activated. Then the "check-focus" subroutine will be called. If switch 160 is placed in a neutral position, then and in that event the "check-focus" subroutine will be called. When returning from the "check-focus" subroutine, the "shutter trip" switch is checked. If shutter button 162 is not pressed the "shutter trip" subroutine will not be called. However, if shutter button 162 is depressed the "call trip shutter" subroutine will be called. After the above mentioned activities have been completed the program will return to its beginning i.e., "micro controller wake up". If micro controller wake up is not awakened, then the micro controller will sit and monitor the wake up.

Figure 7B:
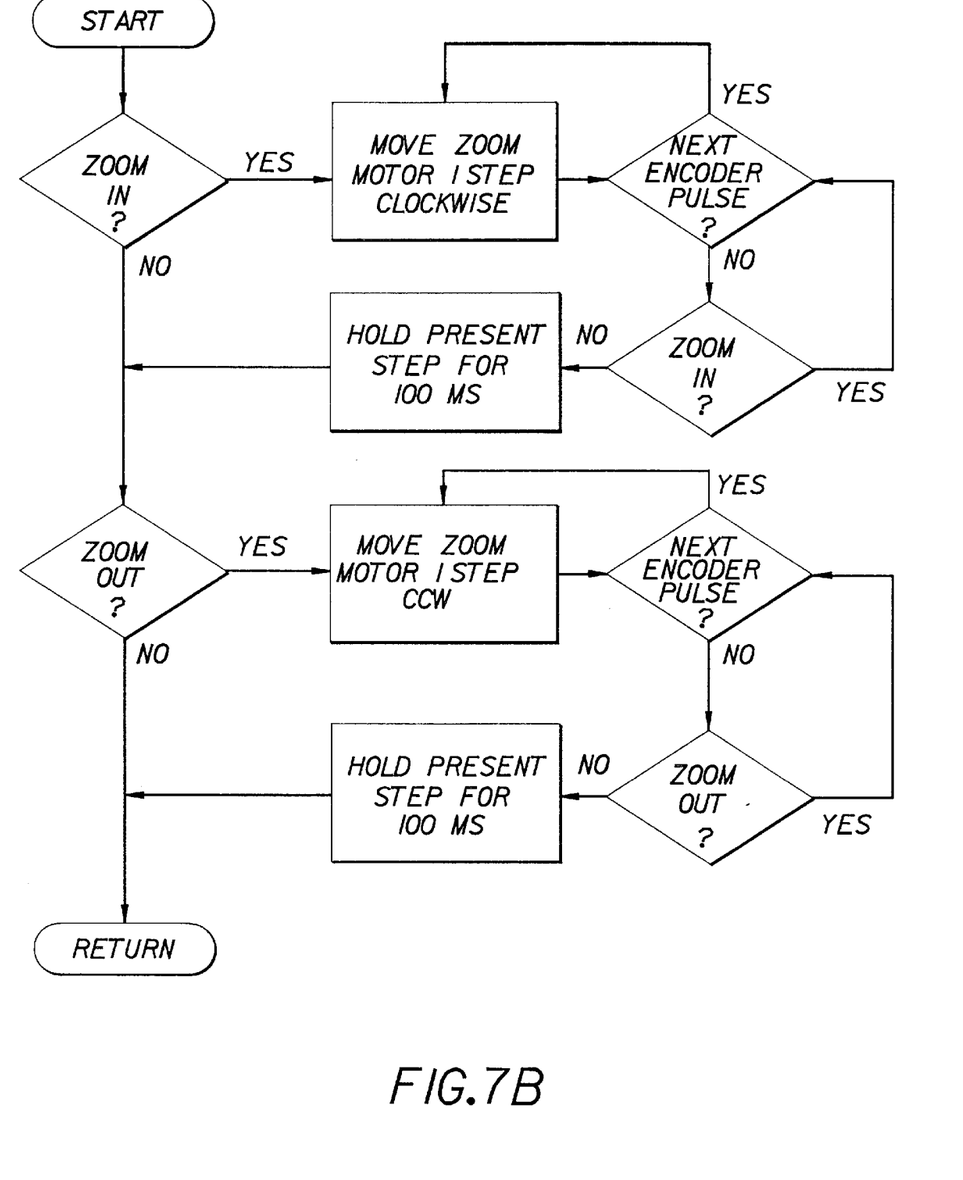

FIG. 7B is a flow chart of the "run-zoom" subroutine. When the run-zoom subroutine is started, the first decision that will be made is the position of switch 160. If switch 160 is placed in the "zoom in" position then the "move zoom motor one step clockwise" subroutine will be called. The foregoing will cause stepper motor 11 to move one step clockwise.

Once stepper motor 11 is commanded to move one step clockwise, the program will monitor the feedback signal transmitted on wire 140, along with the "zoom in" command transmitted on wire 151. In the event the encoder pulse occurs and the "zoom in" command is still present, the program will cause stepper motor 11 to move another step clockwise. In the event the "zoom in" command ceases to be activated, the program will hold stepper motor 11 in its present location for 100 ms., and return to the main line of the program (FIG. 7A) and call the check-focus subroutine.

If switch 160 is placed in the "zoom out" position then the "move zoom motor one step counterclockwise" subroutine will be called. The foregoing will cause stepper motor 11 to move one step counterclockwise.

Once stepper motor 11 is commanded to move one step counterclockwise, the program will monitor the feedback signal transmitted on wire 140, along with the "zoom out" command transmitted on wire 152. In the event the encoder pulse occurs and the "zoom out" command is still present, the program will cause stepper motor 11 to step another step counterclockwise. In the event the "zoom out" command ceases to be activated, the program will hold stepper motor 11 in its present location for 100 ms., and return to the main line of the program (FIG. 7A) and call the "check-focus" subroutine.

Figure 7C:
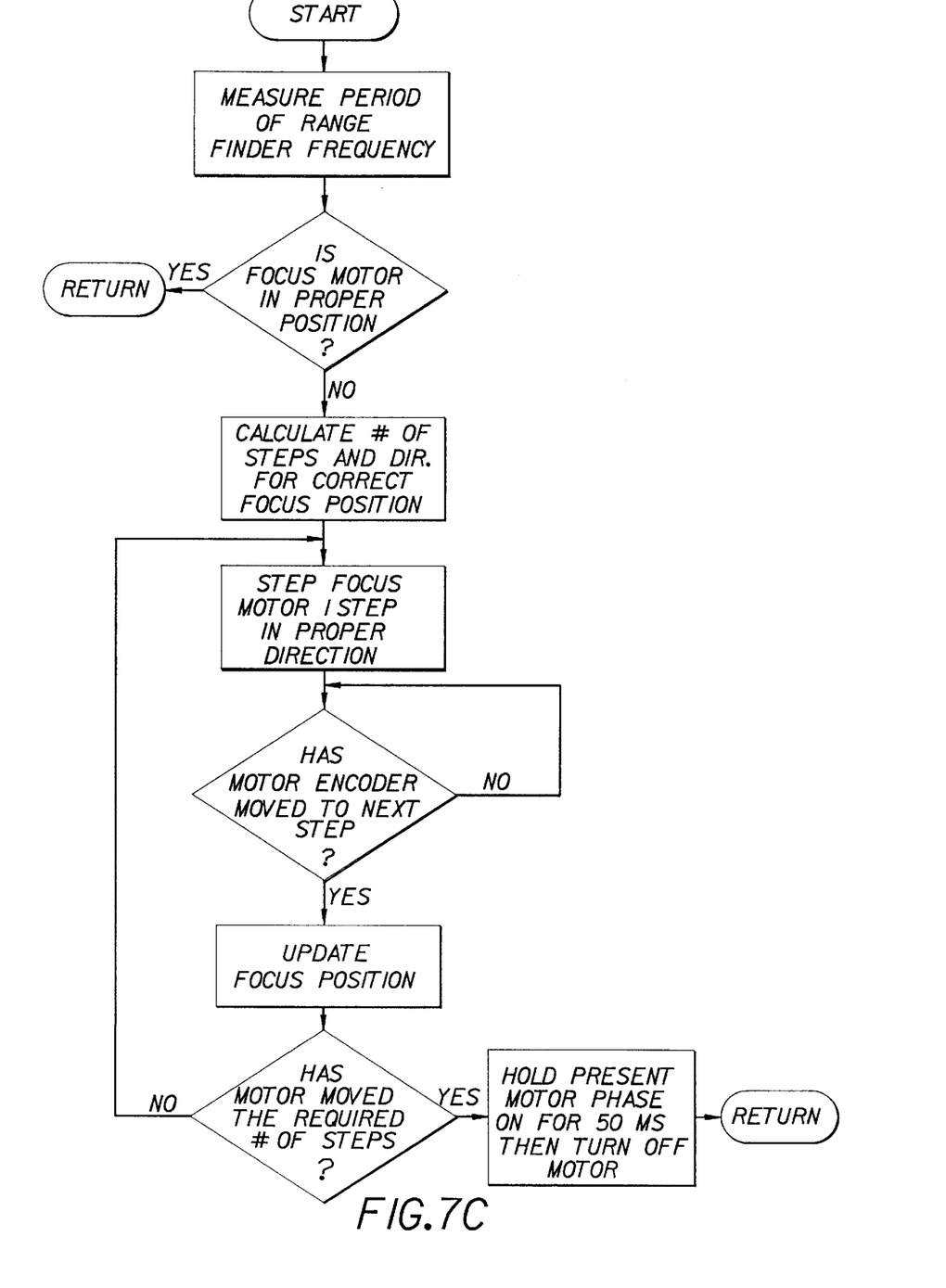

FIG. 7C is a flow chart of the "check-focus" subroutine. When the "check-focus" subroutine is started, the software measures the period of the signal transmitted by automatic focus module 161. The software analyzes the time of the aforementioned period and determines if a correction to the focus is required. If no correction to the focus is required, the software returns to the main line of the program (FIG. 7A) and checks the "shutter trip switch". If a correction to the focus is required the software calculates the number of steps and direction to command motor sensor module 150 to achieve a correct focus position.

After the aforementioned calculation is completed, a step command is transmitted to stepper motor 11 via wires 141–144. The software then monitors the feedback signal transmitted on wire 140 to determine when subsequent step commands shall be issued. As each step is completed, the "focus position" in the program is updated.

At this point the software makes a decision on whether or not the required calculated number of steps has been completed. If the answer to the above is no, then the program loops back to the "step focus motor 1 step in proper direction" portion of the program. If the answer to the above question is yes, the program will hold the present motor phase on motor sensor module 150 for 50 ms. and then return to the main line of the program (FIG. 7A) and check the "shutter trip switch".

Figure 7D:
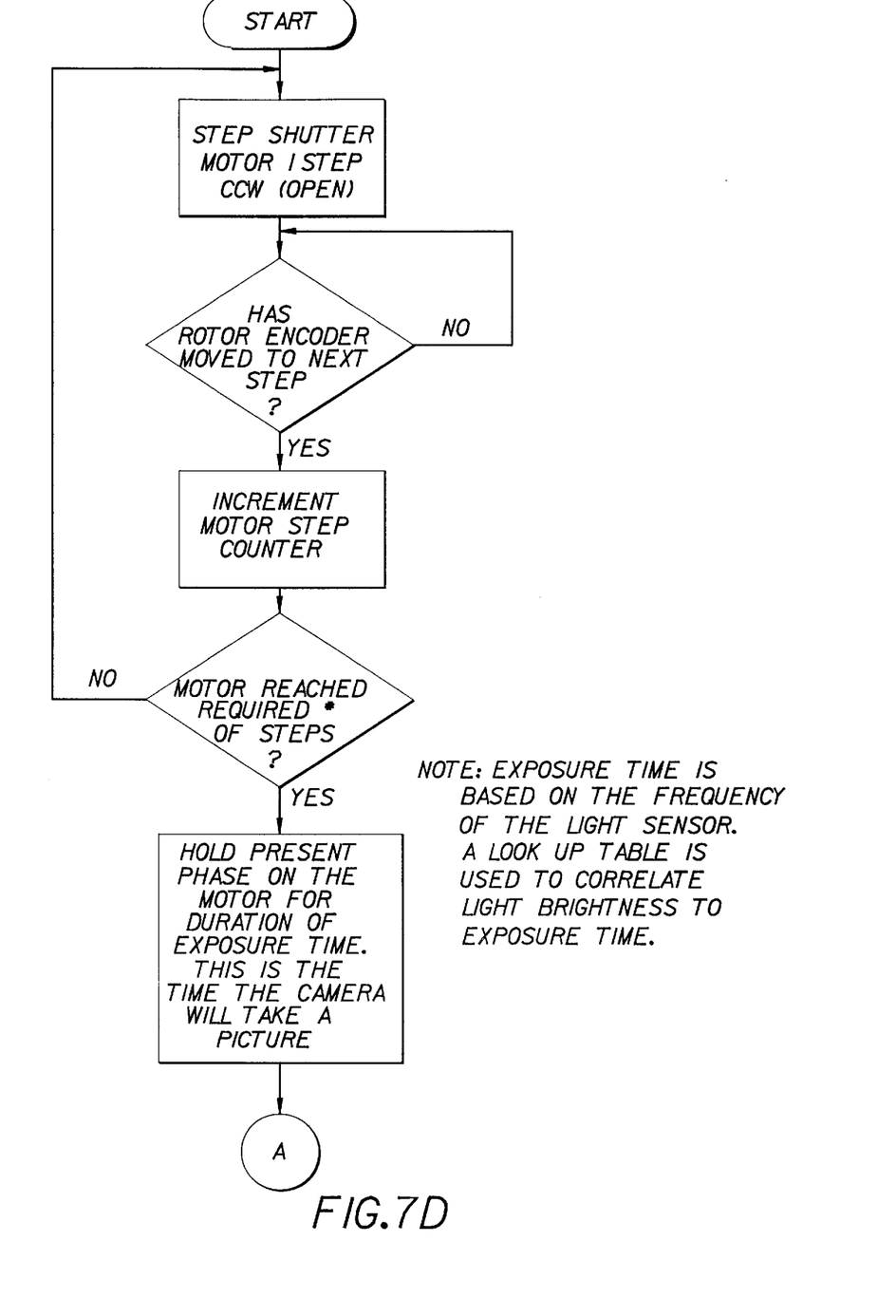
Figure 7E:
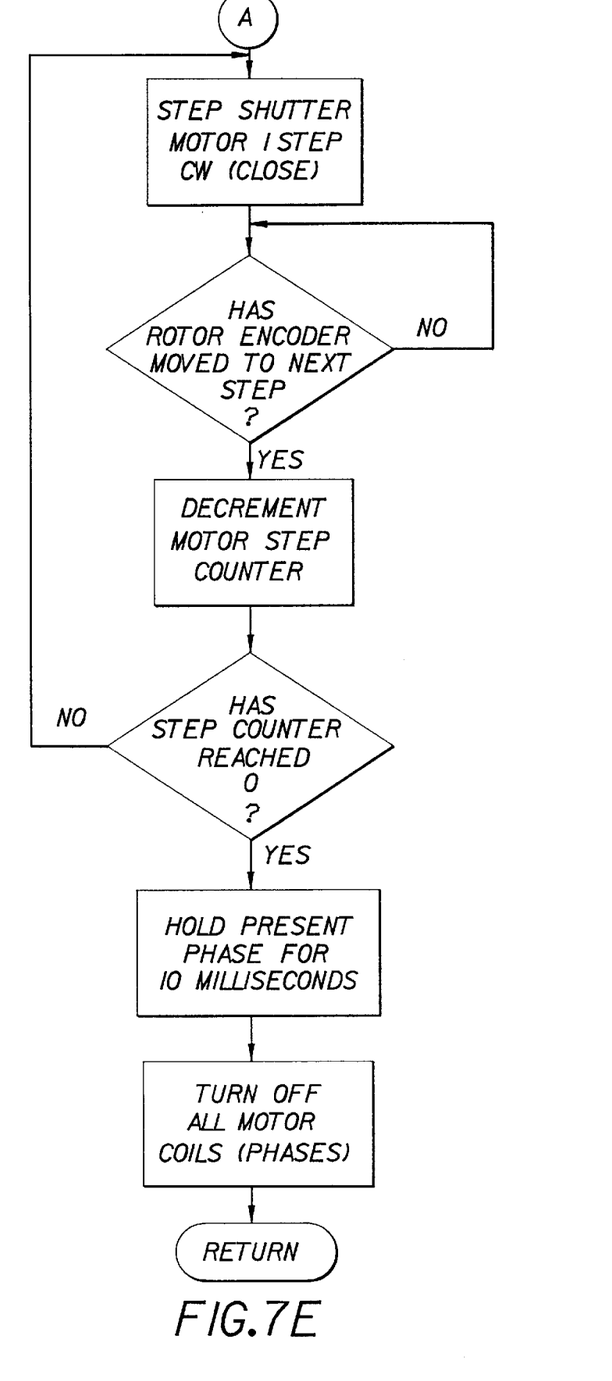

FIGS. 7D and 7E is a flow chart of the "trip shutter" subroutine shown in FIG. 7A. When the "trip shutter" subroutine is started, the software commands motor sensor module 150 to move one step counterclockwise. The software then monitors the feedback signal on wire 140 to determine when stepper motor 11 has moved one step. When stepper motor 11 moves one step, the software increments a "motor step counter" contained in the software. The software then determines if the above counter has achieved the required number of steps. If the counter has not reached the required number of steps, the program returns to "step shutter motor 1 step" subroutine to issue another counterclockwise step command. When the required number of steps is reached, the software will hold the present phase on stepper motor 11 for the duration of the exposure time. The exposure time is determined from the look up table contained in micro controller 154, which was described in the description of FIG. 5.

After the exposure time has expired, the software commands motor sensor module 150 to step clockwise. The software then monitors the feedback signal on wire 140 to determine when stepper motor 11 has moved one step. When stepper motor 11 moves one step, the software decrements the "motor step counter" contained in the software. The software then determines if the above counter has a count equal to zero. If the counter has not reached zero, the program returns to "shutter motor 1 step" subroutine to issue another clockwise step command. When the required number of steps is reached, i.e., the "motor step counter" has a count equal to zero, the software will hold the present phase on stepper motor 11 for 10 ms. Then the software deenergizes stepper motor 11 and returns to the main line (FIG. 1) and monitors "micro controller wake up".

Figure 8:
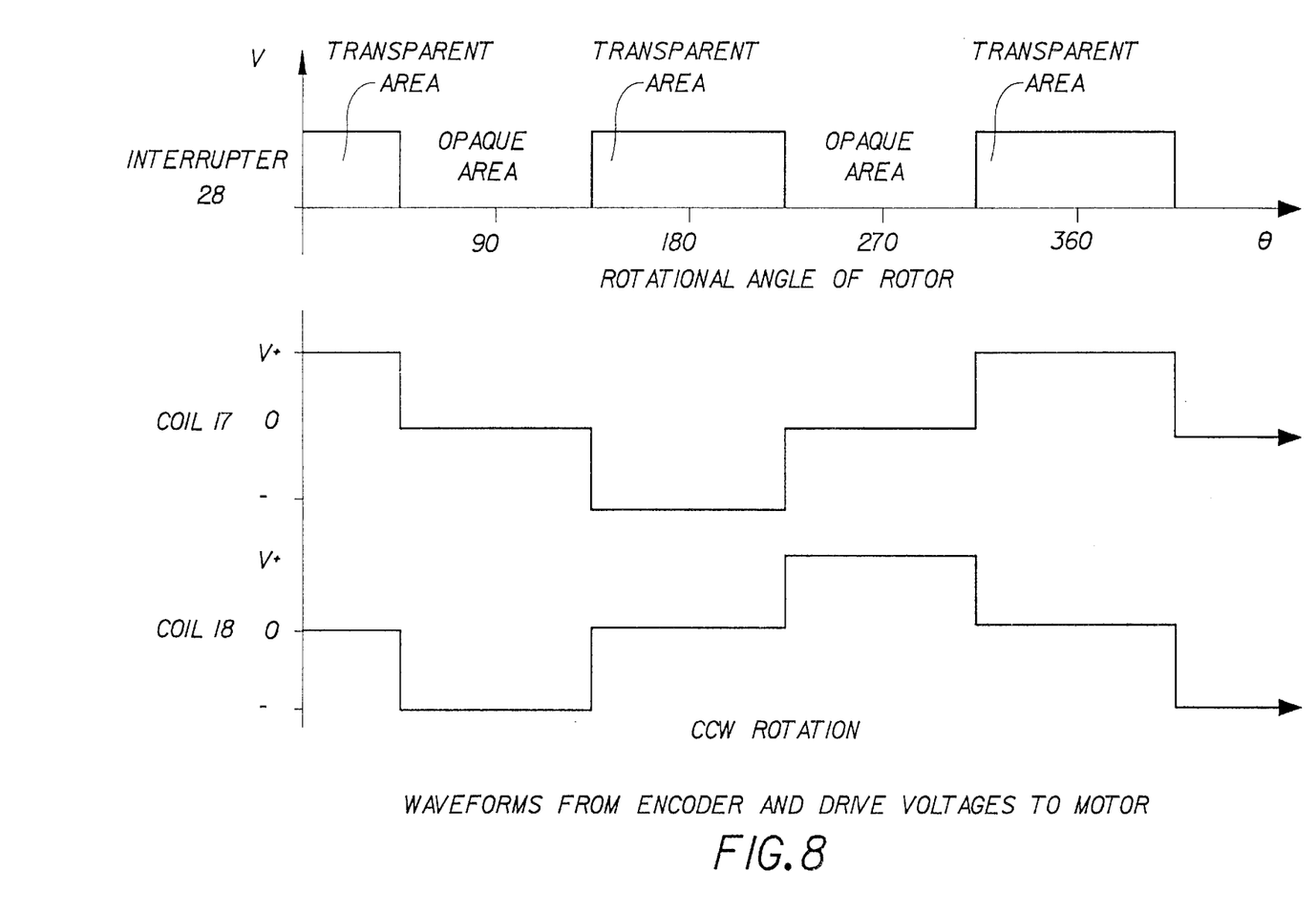
FIG. 8 is a diagram of the output signal voltage of interrupter 28 vs. the rotation of rotor 20.

FIG. 8 is a drawing of the output signal voltage of interrupter 28 i.e., the feedback signal being transmitted on wire 140 vs. the rotational angle of rotor 20. The drawing illustrates that at the transitions between transparent areas 26 and opaque areas 27 of disk 25 the current in coils 17 and 18 will change.

Figure 9:
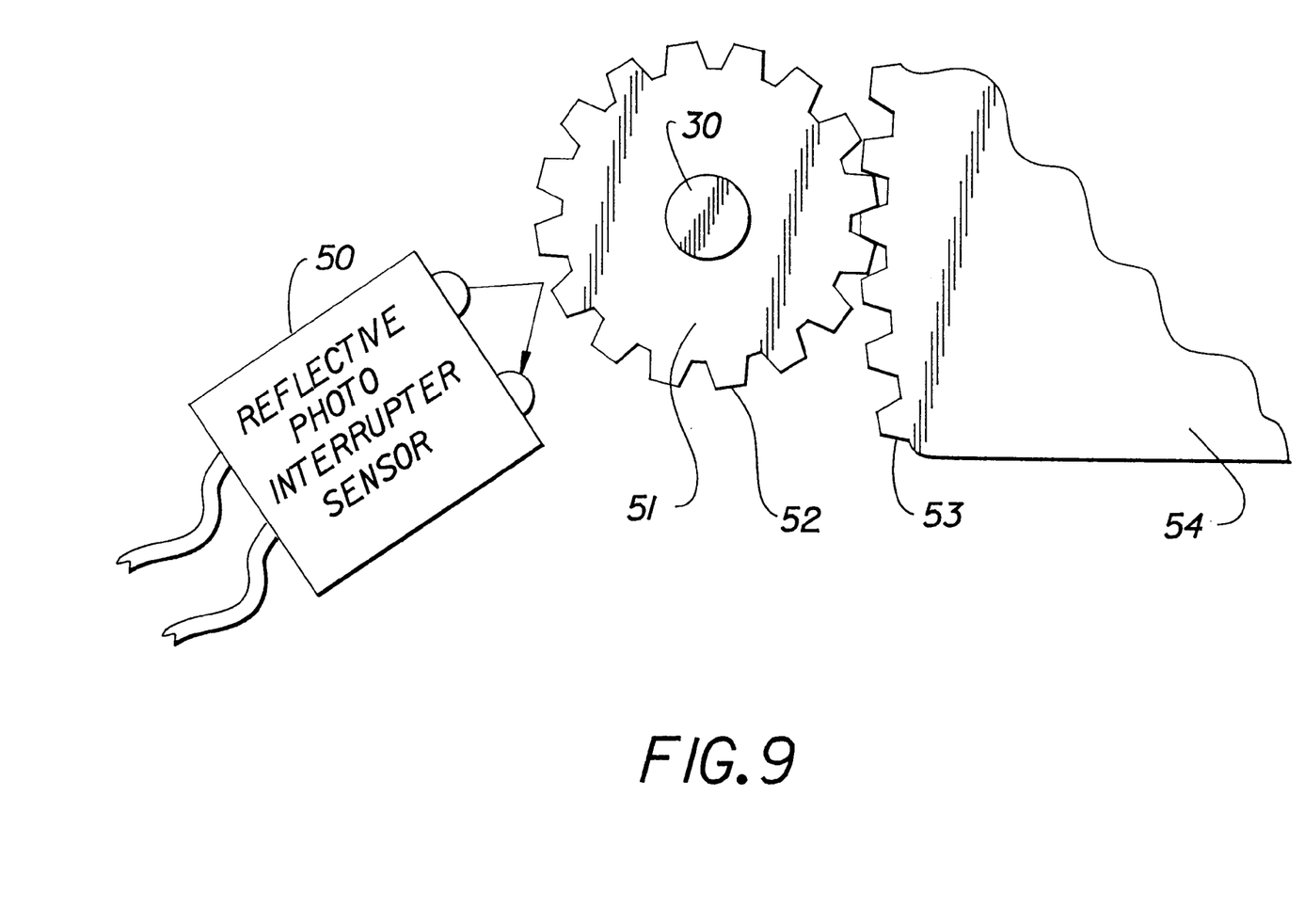
FIG. 9 is a diagram of a alternate embodiment of this invention using an optical interrupter and a gear that is attached to the shaft of rotor 20 of stepper motor 11.

FIG. 9 is an alternate embodiment of the invention shown in FIG. 2. A reflective photo-interrupter sensor 50 is positioned in proximity to the circumference of pinion 51. Pinion 51 has 15 teeth 52 along its outer circumference, which mesh with teeth 53 of sector ring gear 54. The number of teeth 52 on pinion 51 has to equal or be a whole multiple of the number of steps needed to complete a full revolution of rotor 20 of stepper motor 11. Thus, in the case illustrated above, stepper motor 11 of FIG. 1 would have 15 steps per revolution of rotor 20. Sensor 50 senses the motion of pinion 51 which represents the rotational position of rotor 20. Pinion 51 is connected to stepper motor 11(not shown) by shaft 30.

The logic and control electronics of stepper motor 11 depicted in FIG. 6, is described in the description of FIG. 4.

Pinion 51 must be aligned with the magnetic poles on rotor 20 and sensor 50 must be located at the proper angular position from teeth 52 so that sensor 50 is looking at a point midway between teeth 52 on pinion 51. Thus, teeth 52 and sensor 50 have the same positional relationship as disk 25 and interrupter 28 of FIG. 2.

Figure 10:
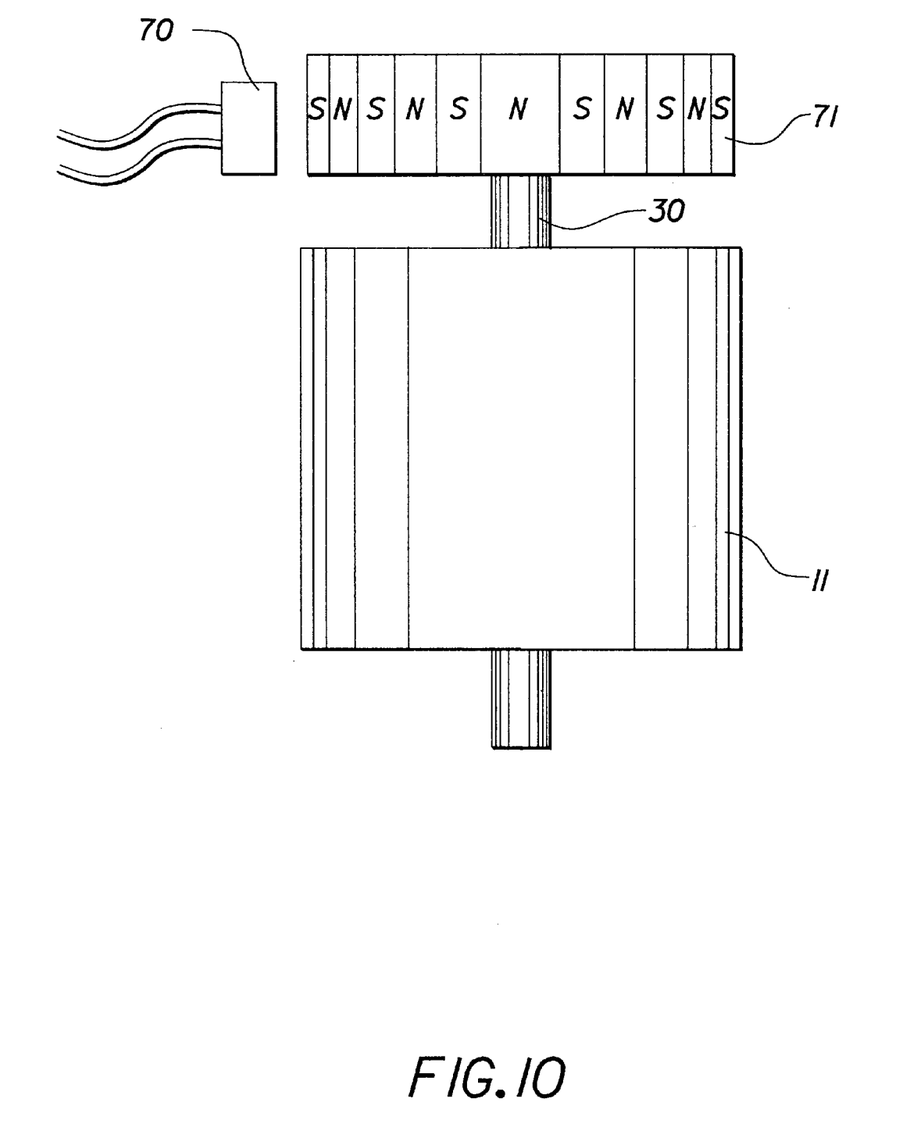
FIG. 10 is an alternate embodiment showing a Hall effect sensor being used as a feedback mechanism.

FIG. 10 is an alternate embodiment of the invention shown in FIG. 2. A Hall effect sensor 70 is positioned in close proximity to magnetic sensor wheel 71. Sensor wheel 71 is connected to stepper motor 11 by shaft 30. Sensor wheel 71 has alternate magnetic north and south poles along its circumference. The north poles are designated by the letter N and the south poles are designated by the letter S. The configuration of the alternating north and south poles of wheel 71 are designed in a manner that they will have twice the number of the magnetic poles as does rotor 20. The north and south poles of wheel 71 are used in a similar fashion to transparent areas 26 and opaque areas 27 of disk 25 of FIG. 2. In other words the number of north and south poles of wheel 71 must equal the number of steps or be whole multiples of the number of steps of rotor 20 to complete one full revolution.

The above specification describes a new and improved mechanism for controlling a stepper motor that drives one or more shutter blades. It is realized that the above description may indicate to those skilled in the art additional ways in which the principals of this invention may be used without departing from the spirit. It is, therefore, intended that this invention be limited only by the scope of the appended claims.

Parts List slot 10 stepper motor 11 stator 12 rotor 20 teeth 13 teeth 14 teeth 15 teeth 16 coil 17 coil 18 disk 25 transparent areas 26 opaque areas 27 optical interrupter 28
shaft 30
photo-interrupter sensor 50
pinion 51
teeth 52
teeth 53
ring gear 54
Hall effect sensor 70
magnetic sensor wheel 71
shutter blade 127
shutter blade 128
shutter blade 129
pin 130
pin 131
pin 132
pin 135
pin 136
pin 137
feedback wire 140
drive signal wire 141
drive signal wire 142
drive signal wire 143
drive signal wire 144
motor sensor module 150
wire 151
wire 152
wire 153
micro controller 154
dual H bridge driver 155
manual three position switch 160
automatic focusing module 161
Shutter button 162
light meter module 163
gear 170

What is claimed is:

1. A device for controlling a stepper motor that drives one or more camera elements, in which the rotation and position of the rotor of the stepper motor is monitored to determine when the next step of the stepper motor should be stepped, said device characterized by:
    a rotor positional indicator having equally spaced first and second areas that are a whole number multiple of the number of steps for one full revolution of the rotor of the stepper motor;
    means coupled to said indicator for detecting the transitions between said first and second areas; and
    means coupled to said detecting means for rotating the rotor of the stepper motor relative to the position of the rotor of the stepper motor so that the stepper motor has the proper number of steps to cause the camera element to move to the correct position.

2. The device claimed in claim 1, wherein the camera elements are one or more shutter blades.

3. The device claimed in claim 1, wherein the camera element is an automatic focusing mechanism.

4. The device claimed in claim 1, wherein the camera element is a zoom.

5. The device claimed in claim 1, wherein said indicator is a disk.

6. The device claimed in claim 5, wherein the first areas of said disk are transparent and the second areas of said disk are opaque.

7. The device claimed in claim 1, wherein said detection means is an optical interrupter.

8. The device claimed in claim 1, wherein said rotating means comprises:
    means coupled to said positional indicator and said detecting means for controlling the position of the rotor of the stepper motor by comparing the position of the rotor with the number of transitions detected by said detecting means; and
    means coupled to said controlling means and to the coils of the stepper motor for moving the coils of the stepper motor the correct number of steps.

9. The device claimed in claim 8, wherein said controlling means is a microprocessor.

10. The device claimed in claim 9, wherein said moving means is a dual H bridge driver.

11. The device claimed in claim 10, further including: a switch that is coupled to one or more of the camera elements and to said microprocessor in order to connect the camera element to said microprocessor.

12. The device claimed in claim 11, further including: a light meter that is connected to said microprocessor, said light meter determines the amount of light that is available for the camera to take a picture.

13. The device claimed in claim 10, further including an automatic focusing device that is coupled to said microprocessor and one of the camera elements, said focusing device determines the focus of the object that the camera is photographing.

14. A device for controlling a stepper motor that drives one or more shutter blades, in which the movement and position of the rotor of the stepper motor is monitored to determine when the next step of the stepper motor should be stepped, said device characterized by:
    a pinion gear connected to the shaft of the stepper motor, said pinion having a number of equally displaced teeth that equal the number of steps for one full revolution of the rotor of the stepper motor;
    means coupled to said pinion for detecting the movement of said pinion; and
    means coupled to said detecting means for rotating the rotor of the stepper motor relative to the position of the rotor of the stepper motor so that the stepper motor moves the proper number of steps to cause the shutter blades to form the correct aperture size.

15. The device claimed in claim 14, wherein said detection means is a reflective photo-interrupter.

16. A device for controlling a stepper motor that drives one or more shutter blades, in which the movement and position of the rotor of the stepper motor is monitored to determine when the next step of the stepper motor should be stepped, said device characterized by:
    a permanent magnet with alternating magnetic poles which equal the number of steps of the rotor of the stepper motor which equal one full revolution of the rotor of the stepper motor;
    means coupled to said magnet for detecting the movement of said magnet; and
    means coupled to said detecting means for rotating the rotor of the stepper motor relative to the position of the rotor of the stepper motor so that the stepper motor has the proper number of steps to cause the shutter blades to form the correct aperture size.

17. The device claimed in claim 16, wherein said detecting means is a Hall sensor.

* * * * *